United States Patent [19]

Ogasawara

[11] Patent Number: 4,506,150

[45] Date of Patent: Mar. 19, 1985

[54] AUTOMATIC FOCUS ADJUSTING DEVICE WITH A BRIGHTNESS DEPENDENT LENS DRIVE SIGNAL

[75] Inventor: Akira Ogasawara, Yokohama, Japan

[73] Assignee: Nippon Kogaku K.K., Tokyo, Japan

[21] Appl. No.: 463,676

[22] Filed: Feb. 4, 1983

[30] Foreign Application Priority Data

Feb. 19, 1982 [JP] Japan ................... 57-24555

[51] Int. Cl.$^3$ ............................................. G03B 3/10
[52] U.S. Cl. ..................................... 250/204; 250/201; 354/402
[58] Field of Search ................ 250/204, 201 PF, 201, 250/209; 354/402, 408, 409

[56] References Cited

U.S. PATENT DOCUMENTS 4,078,171  3/1978  Stauffer .................. 250/201 PF
4,264,810  4/1981  Utagawa et al. ............ 250/204
4,447,719  5/1984  Ogasawara ................. 250/204

Primary Examiner—Edward P. Westin
Attorney, Agent, or Firm—Fitzpatrick, Cella, Harper & Scinto

[57] ABSTRACT

An automatic focus adjusting device comprises a charge accumulating type photoelectric conversion element array, a circuit for outputting from the output of the photoelectric conversion element array a signal indicative of the in-focus state of the image of an object to be photographed on a film surface, a circuit for modifying the newest detection signal on the basis of at least one past detection signal and outputting a modification signal, a circuit for selecting one of the detection signal and the modification signal in accordance with the brightness of the object to be photographed, and a circuit for driving a picture-taking lens in a direction in which the image of the object to be photographed is focused on the film surface, on the basis of the signal selected by the selecting circuit.

10 Claims, 15 Drawing Figures

AUTOMATIC FOCUS ADJUSTING DEVICE WITH A BRIGHTNESS DEPENDENT LENS DRIVE SIGNAL

BACKGROUND OF THE INVENTION

1. Field of the Invention

This invention relates to an automatic focus adjusting device of a camera or the like.

2. Description of the Prior Art

As a device of this type, there is a distance measuring and automatic focus adjusting device which determines the object distance by using an array of charge accumulating type photoelectric conversion elements comprising charge coupled devices (hereinafter referred to as CCD) disclosed, for example, in U.S. Pat. No. 4,078,171.

Two types of the distance measuring and automatic focus adjusting device using such type of charge accumulating type photoelectric conversion element array are conceivable. A first type is an automatic focus adjusting device in which distance measurement is effected in accordance with the output from the photoelectric conversion element array corresponding to the accumulated charge at a point of time whereat the picture-taking lens of the camera is stopped from moving and on the basis thereof, the picture-taking lens is driven to the determined distance. A second type is a device which uses the output of the charge accumulating type photoelectric conversion element array for distance measurement during both movement and stoppage of the picture-taking lens.

In these two types of systems, the conformity with the conditions of the object to be photographed becomes a problem depending on the length of the quantity-of-light integrating time (charge accumulating time) of the photoelectric conversion element array or of the response time of the picture-taking lens driving system. That is, in the former type, where the brightness of the object is low and the quantity-of-light integrating time is relatively long, accuracy of the picture-taking lens driving and quick response can be expected, but when the brightness of the object becomes high and the quantity-of-light integrating time becomes relatively short, the picture-taking lens driving system becomes sharply responsive to camera vibration (hand vibration) or movement of the object and therefore, the stability of the picture-taking lens driving becomes poorer. On the other hand, in the latter type, when the brightness of the object is high, smooth and stable picture-taking lens driving can be expected for camera vibration or movement of the object, but when the brightness of the object becomes lower, the quantity of light integrating time of the photoelectric conversion element array becomes relatively long and therefore, the responsiveness of the picture-taking lens driving is aggravated (the response becomes slower).

SUMMARY OF THE INVENTION

It is an object of the present invention to provide an automatic focus adjusting device in which good responsiveness and stability can be obtained over both the high and the low range of the brightness of an object to be photographed.

The present invention comprises a charge accumulating type photoelectric conversion element array, means for putting out from the output of the photoelectric conversion element array a signal indicative of the infocus state of the image of an object to be photographed on a film surface, means for modifying the newest detection signal on the basis of at least one past detection signal and putting out a modification signal, means for selecting one of the detection signal and the modification signal in accordance with the brightness of the object to be photographed, and means for driving a picture-taking lens in a direction in which the image of the object to be photographed is focused on the film surface, on the basis of the signal selected by the selecting means.

The invention will become more fully apparent from the following detailed description thereof taken in conjunction with the accompanying drawings.

DESCRIPTION OF THE PREFERRED EMBODIMENTS

Figure 1:
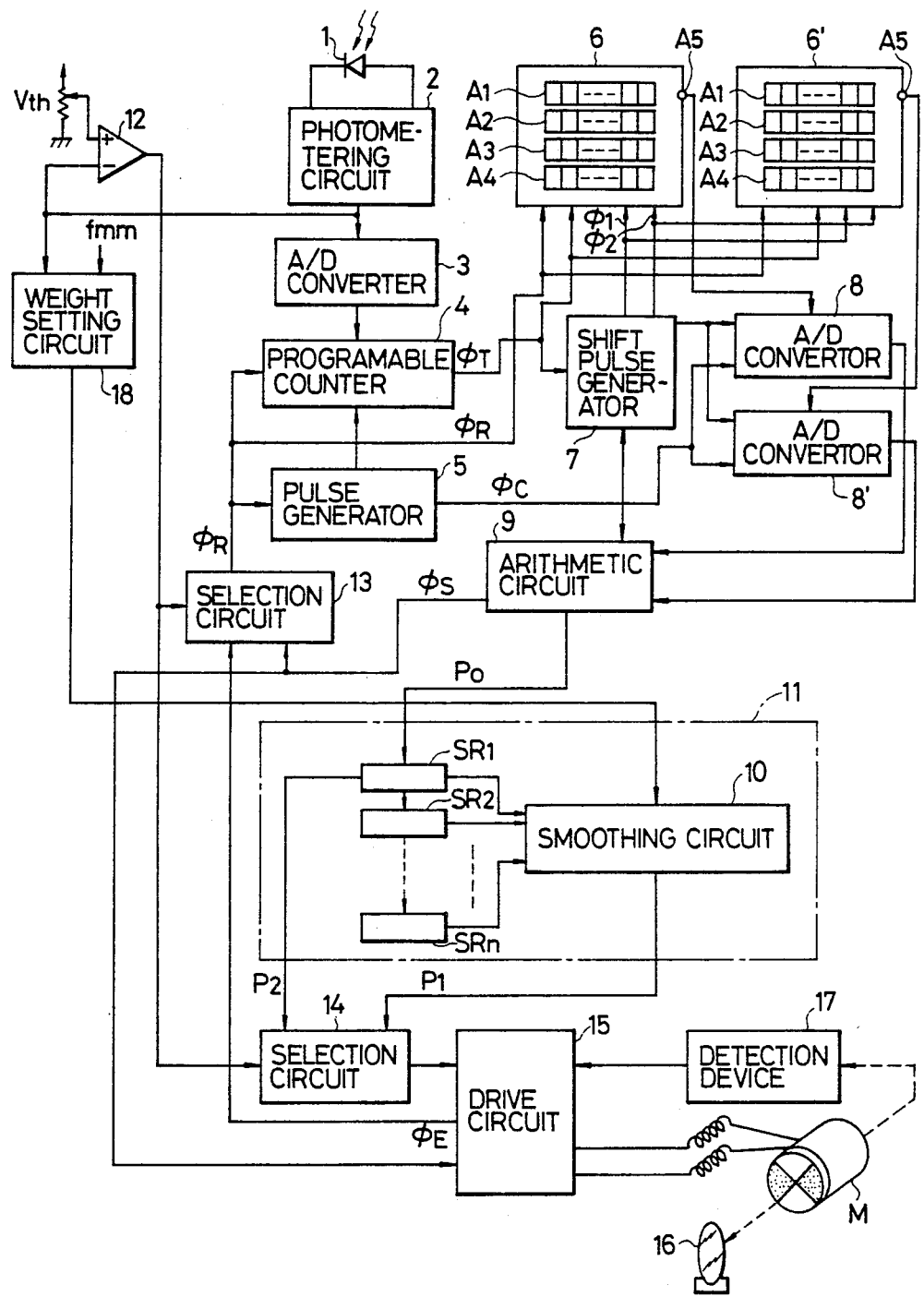
FIG. 1 is a block diagram showing an embodiment of the present invention.

The invention will hereinafter be described with respect to an embodiment thereof. FIG. 1 is a block diagram showing an embodiment of the camera of the present invention which permits interchange of the picture-taking lens. A photometering circuit 2 having a photodiode 1 produces a photometering output corresponding to the brightness of an object to be photographed. An A/D converter 3 for charge accumulation presetting produces a digital output corresponding to the photometering output to a programmable counter (hereinafter simply referred to as the counter) 4. A pulse generator 5 generates a clock pulse $\phi_C$. CCD distance measuring sensors 6 and 6' for receiving the light passed through the picture-taking lens have analog shift registers $A_1$, shift gates $A_2$, photodiode array $A_3$, analog switches $A_4$ and output terminals $A_5$. A shift pulse generator 7 receives a clock pulse as input and applies to the CCD distance measuring sensors 6 and 6' shift pulses $\phi_1$ and $\phi_2$ for transferring to the output terminals $A_5$ the charges accumulated in the photodiode arrays $A_3$. A/D converters 8 and 8' A/D-convert the outputs of the CCD distance measuring sensors 6 and 6' (the outputs of the output terminals $A_5$). This A/D-converting operation is effected in synchronism with the shift pulses and with the clock pulse $\phi_C$ as the reference pulse. An arithmetic circuit 9 such as a microcomputer or the like receives the outputs of the A/D converters 8 and 8' as inputs and calculates control information indicative of the infocus position of the picture-taking lens. This calculating operation is effected at each charge accumulation period of the CCD distance measuring sensors 6 and 6', and when the calculating operation is terminated, digitalized control information $P_0$ with a strobe pulse $\phi_S$ is put out. Since the operations of the CCD distance measuring sensors 6 and 6' are the same, description of the CCD distance measuring sensor 6' will hereinafter be omitted. The control information $P_0$ comprises the data of the amount of movement of the picture-taking lens 16 in the direction of the optical axis relative to the lens position during charge accumulation and the data of the back and forth movement thereof in the direction of the optical axis, and is represented by $\pm X$, for example. The value X is the data of the amount of movement, and the sign $\pm$ is the data of the directions of movement in the direction of the optical axis. The mathematical analysis of the control information $P_0$ was already accomplished by U.S. Pat. No. 4,264,810, for example.

N shift registers $SR_1$-$SR_n$ are for successively storing the control information from the arithmetic circuit 9. The control information time-serially put out is pushed down in the shift registers $SR_1$-$SR_n$ in accordance with the order of outputting thereof. That is, assuming that n pieces of control information stored in the shift registers $SR_1$-$SR_n$ are $X_t, X_{t-1}, \ldots, X_{t-n+1}$, and the control information becomes new in the order of $X_{t-n+1}, X_{t-n+2}, \ldots, X_t$, the newest control information $X_t$ is stored in the shift register $SR_1$ and the oldest control information $X_{t-n+1}$ is stored in the shift register $SR_n$. A smoothing circuit 10 carries out the following calculation with the outputs $X_t, X_{t-1}, \ldots, X_{t-n+1}$ of the shift registers $SR_1$-$SR_n$ as inputs. That is, when the smoothing (filter) output is Y, the smoothing output Y is given by equation (1).

$$Y = \frac{a_1 \cdot X_t + a_2 \cdot X_{t-1} + \ldots + a_n \cdot X_{t-n+1}}{a_1 + a_2 + \ldots + a_n} \quad (1)$$

where $a_1, a_2, \ldots, a_n$ are weights. That is, the smoothing circuit 10 includes means for multiplying the control information $X_t, X_{t-1}, \ldots, X_{t-n+1}$ by $a_1, a_2, \ldots, a_n$, respectively, means for taking the sum of the result of the multiplication, and means for dividing said sum by the sum of weights $a_1, a_2, \ldots, a_n$. The shift registers $SR_1$-$SR_n$ and the smoothing circuit 10 together constitute a digital filter circuit 11. Hereinafter, the result of the calculation of the smoothing circuit will be referred to as the filter output $P_1$ and the newest control information stored in the shift register $SR_1$ will be referred to as the static output $P_2$.

The output timings of the control information $P_0$ of the arithmetic circuit 9 and the filter output $P_1$ of the smoothing circuit 10 are in synchronism with each other.

A comparator 12 receives the photometering output of the photometering circuit 2 and a reference output $V_{th}$ as inputs, and puts out Low (hereinafter referred to as L) when the brightness of the object is higher than a predetermined value, and puts out High (hereinafter referred to as H) when the brightness of the object is lower than the predetermined value. A first selection circuit 13 and a second selection circuit 14 receive the output of the comparator 12 as input. The first selection circuit 13 puts out a strobe pulse $\phi_S$ when the output of the comparator 12 is L, and puts out a lens drive termination pulse $\phi_E$ (the details of which will be described later) as a reset pulse $\phi_R$ when the output of the comparator 12 is H. This reset pulse $\phi_R$ is applied to the counter 4, the pulse generator 5 and the CCD sensor 6. The second selection circuit 14 applies the filter output $P_1$ to a drive circuit 15 when the output of the comparator 12 is L, and applies the static output $P_2$ to the drive circuit 15 when the output of the comparator 12 is H.

Figure 2:
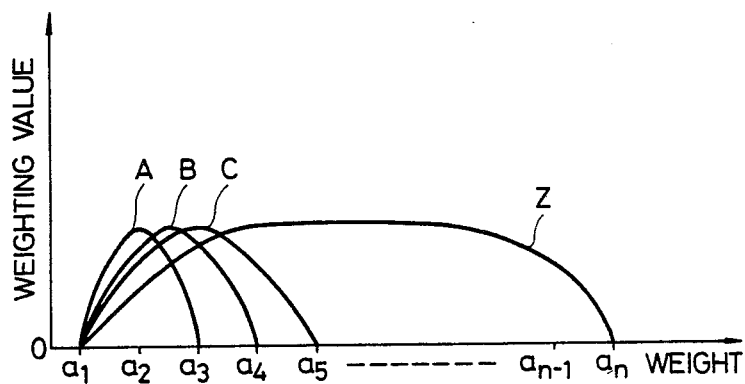
FIG. 2 is a graph showing a specific example of the weight setting.

The drive circuit 15 receives as inputs the filter output $P_1$ or the static output $P_2$ from the selection circuit 14 and the strobe pulse $\phi_S$ from the arithmetic circuit 9. The drive circuit 15 reads in the output from the second selection circuit 14 by receiving the strobe pulse $\phi_S$ as input. The picture-taking lens 16 is moved back and forth in the direction of the optical axis by a motor M. The amount of movement of the lens 16 is monitored by a detection device 17. The drive circuit 15 stops driving the motor M and applies the lens drive termination pulse $\phi_E$ to the first selection circuit 13 when the amount of movement of the lens 16 in the direction of the optical axis is in accord with the amount of movement given by the filter output $P_1$ or the static output $P_2$. The drive circuit 15, the motor M and the detection device 17 together constitute a servo control system for the lens 16. A weight setting circuit 18 sets the weights $a_1$-$a_n$ of equation (1) with the photometering output and the focal length information fmm of the interchangeable lens 16 as inputs. The values of the weights are automatically set in accordance with the brightness of the object and the focal length of the lens. What should be considered in that case is that the filter output $P_1$ as the servo target must vary smoothly. It is for the purpose of causing the lens 16 not to effect stiff movement. Therefore, it becomes the standard of the setting of the weights that (a) when a long focus lens is used, the influence of the hand vibration of the camera appears in the distance measurement output and the control information $P_0$, but when a short focus lens is used, such influence hardly appears and that (b) when the brightness of the object is high, the charge accumulating time of the CCD distance measuring sensors 6 and 6' and the output period of the control information $P_0$ are short, but when the brightness of the object is low, they are long. For example, the greater is the focal length of the lens and the higher is the brightness of the object, the smaller is made the number of terms of the weights whose value is zero. For example, FIG. 2 shows the settings of the values of the weights by curves A, B, C, ..., Z. In this case, the greater is the focal length of the lens and the higher is the brightness of the object, the more are varies the settings of the values of the weights from A to B, C, ..., Z. On the other hand, each of the weights $a_1$-$a_n$ is determined by the equilibrium of the so-called filter theory and the actual responsiveness of the servo control system.

Figure 4:
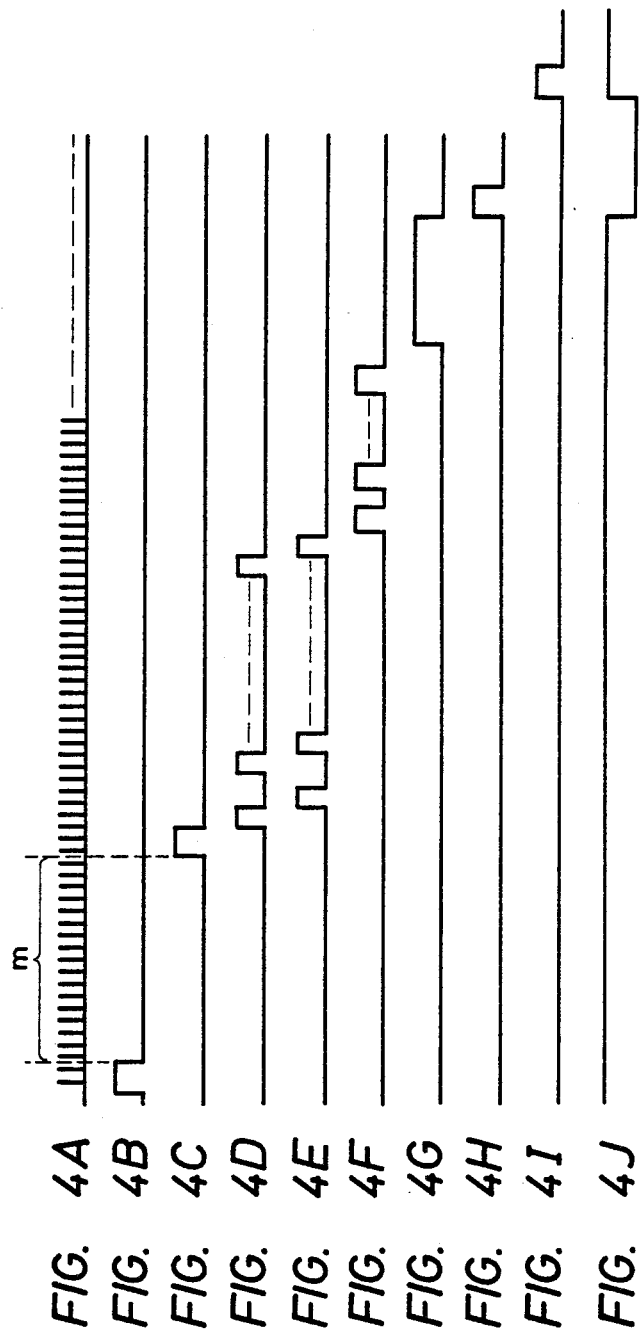
FIGS. 4A, 4B, 4C, 4D, 4E, 4F, 4G, 4H, 4I and 4J are time charts illustrating the operation of the embodiment of FIG. 1.

Operation will hereinafter be described by reference to the timing chart of FIG. 4.

(A) Operation of the CCD distance measuring sensor 6 and the circuits around it:

The photometering circuit 2 and the A/D converter 3 are pre-driven by power resetting. The photometering output from the photometering circuit 2 is digitalized by the A/D converter 3 and applied to the counter 4. The selection circuit 13 puts out an initial reset pulse $\phi_R$ in response to the depression of a release button to a first stroke, and the output of the A/D converter 3 is read into the counter 4 upon rising of the reset pulse $\phi_R$ (FIG. 4B). At the same time, the analog switch $A_4$ of the CCD distance measuring sensor 6 is opened to cut off the connection between the photodiode array $A_3$ and an unshown CCD substrate. At this time, the shift gate $A_2$ also is in OFF state. Accordingly, the photodiode array $A_3$ starts charge accumulation in each of its cells. When the reset pulse $\phi_R$ falls, the counter 4 starts to count the clock pulses $\phi_C$ of the pulse generator 5 (FIG. 4A). When the value of the presetting digital output read into the counter 4 is m, the counter 4 counts the clock pulses corresponding to m and applies a transfer pulse $\phi_T$ to the CCD distance measuring sensor 6 and the shift pulse generator 7 (FIG. 4C). Therefore, the shift gate $A_2$ of the CCD distance measuring sensor 6 is opened and the charge accumulated in each cell of the photodiode array $A_3$ is transferred to the analog shift register $A_1$. In response to the transfer pulse $\phi_T$, the shift pulse generator 7 applies to the CCD distance measuring sensor 6 $\phi_1$ shown in FIG. 4D which is a two-phase shift pulse and $\phi_2$ shown in FIG. 4E. By the action of the shift pulses $\phi_1$ and $\phi_2$, the analog shift register $A_1$ shifts the accumulated charges successively to the output terminal $A_5$. In the present embodiment, $\phi_1$ and $\phi_2$ are two-phase shift pulses, but alternatively, they may be three-phase or four-phase shift pulses. The A/D converter 8 converts the distance measurement outputs from the output terminal $A_5$ successively into digital outputs in synchronism with the shift pulses $\phi_1$ and $\phi_2$ (FIG. 4F). When the shifting operation of the analog shift register $A_1$ is terminated, the shift gate $A_2$ becomes closed and the analog switch $A_4$ becomes closed. Thereby, each cell of the photodiode array $A_3$ is connected to the substrate (the C-MOS capacitor of each cell is short-circuited) with a result that charge accumulation is impeded. As is apparent from the foregoing description, the charge accumulating time of the photodiode array $A_3$ is determined by the digital output preset in the counter 4 (which corresponds to the brightness of the object). This will hereinafter be referred to as AGC (auto gate control) operation for the CCD distance measuring sensor 6. For example, when the brightness of the object is low, the value of m becomes greater to lengthen the charge accumulating time, and when the brightness of the object is high, the value of m becomes smaller to shorten the charge accumulating time. By this, the level of the distance measurement output is maintained constant. Now, the A/D-converted distance measurement output is read into the arithmetic circuit 9, which calculates control information $P_0$ on the basis thereof. This calculating time is a predetermined time as shown in FIG. 4G. When this calculation is terminated, the arithmetic circuit 9 inputs a strobe pulse $\phi_S$ shown in FIG. 4H to the selection circuit 13 and the drive circuit 15 and also inputs the control information $P_0$ to the shift register $SR_1$.

The above-described operation is repeated each time the reset pulse $\phi_R$ is generated, and the control information $P_0$ each time is pushed down into the shift registers $SR_1$-$SR_n$.

The operation of the entire circuit will now be described with respect to the time when the brightness of the object is high above a predetermined value and the time when the brightness of the object is low below the predetermined value.

(B) When the brightness of the object is high:

Since the comparator 12 puts out L, the first selection circuit 13 selects the strobe pulse $\phi_S$ as the reset pulse $\phi_R$ and the second selection circuit 14 selects the filter output $P_1$. Therefore, the drive circuit 15 moves the lens 16 back and forth in the direction of the optical axis through the motor M with the filter output $P_1$ as the servo target. On the other hand, when the strobe pulse $\phi_S$ is used as the reset pulse, the CCD distance measuring sensor 6 starts charge accumulation upon generation of the strobe pulse $\phi_S$ irrespective of whether the lens 16 is being moved back and forth. That is, independently of the response of the servo control system, charge accumulation, control information calculation and filtering are effected to change the servo target (the filter output $P_1$ is read into the drive circuit 15 in synchronism with the strobe pulse $\phi_S$). Thus, the lens 16 is moved back and forth smoothly. When the brightness is high, the charge accumulating time and the control information calculating time are short relative to the period of the hand vibration of the camera and the movement of the object and therefore, the control information $P_0$ which is the output of the arithmetic circuit 9 becomes information which has sharply followed the hand vibration and the movement of the object (hereinafter generally referred to as the fluctuation of the object), while the filter output $P_1$ which is the output of the filter circuit 11 becomes information which has smoothly followed the fluctuation of the object.

(C) When the brightness is low:

Since the comparator 12 puts out H, the first selection circuit 13 selects the lens drive termination pulse $\phi_E$ as the reset pulse $\phi_R$ and the second selection circuit 14 selects the static output $P_2$. Therefore, the drive circuit 15 drives the motor M with the static output $P_2$ as the servo target. When the lens 16 is moved back and forth to a target value, the drive circuit 15 puts out the lens drive termination pulse $\phi_E$ (FIG. 4I). On the other hand, when the lens drive termination pulse $\phi_E$ is put out, the CCD distance measuring sensor 6 starts charge accumulation. The lens 16 is moved by repetition of the above-described operation. That is, the operations of the CCD distance measuring sensors 6, 6', the A/D converters 8, 8' and the arithmetic circuit 9 are effected when the lens 16 is stopped, and the control information $P_0$ put out from the arithmetic circuit 9 is read into the drive circuit 15 in response to the generation of the strobe pulse $\phi_S$, and the lens 16 is moved in accordance with the control information $P_0$.

It is for the reason set forth below that such operation takes place when the brightness is low. When the brightness is low, the charge accumulating time becomes longer due to the AGC operation and therefore, the distance measurement output does not sharply follow the then fluctuation of the object. That is, the distance measurement output corresponds to the value obtained by integrating the intensity of light of the object by the charge accumulating time, i.e., the average value of the quantity of light within the charge accumulating time. Therefore, if the filter output $P_1$ when the brightness is below the servo target, the distance measurement output cannot follow the fluctuation of the object. Therefore, the newest control information in the shift register $SR_1$, i.e., the static output $P_2$ as the servo target, is caused to follow the fluctuation of the object.

Now, the above-described operations (A), (B) and (C) are executed, for example, during the depression of the release button of a single lens reflex camera to a first stroke. When the release button is depressed to a second stroke after termination of the servo control of the lens, shutter release is effected.

While, in the above-described embodiment, the static output $P_2$ is taken out from the shift register $SR_1$, it may be taken out from the shift register $SR_2$. That is, the newest control information can be selected in a range which does not hinder the servo control of the lens. Likewise, the filter output $P_1$ and the static output $P_2$ are automatically selected by the output of the comparator 12, but alternatively, they may be manually selected. For that purpose, whether the filter output $P_1$ or the static output $P_2$ should be selected by the output of the comparator 12 is displayed and, on the basis thereof, the photographer selects one output by means of a manually operated member. At this time, in the first selection circuit 13, whether the strobe pulse $\phi_S$ or the lens drive termination pulse $\phi_E$ is to be selected as the reset pulse $\phi_R$ is also operatively associated therewith. Also, in the above-described embodiment, servo control is effected, but if the lens drive by a pulse motor is effected, the feedback loop can be made unnecessary (open loop control).

Figure 3:
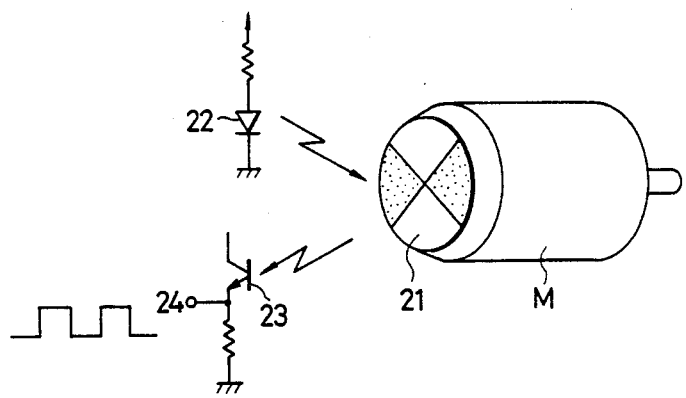
FIG. 3 shows the detection device of FIG. 1.

FIG. 3 shows a specific example of the detection device 17 of FIG. 1. A chart plate 21 in which high reflecting portions and low reflecting portions are provided alternately is provided on the rotary shaft of the motor M. When a light-emitting diode 22 and a phototransistor 23 are connected through the chart plate 21, a pulse output proportional to the number of revolutions of the chart plate 21 is obtained at a terminal 24. If this pulse output is counted, the amount of movement of the lens 16 can be detected.

Figure 5:
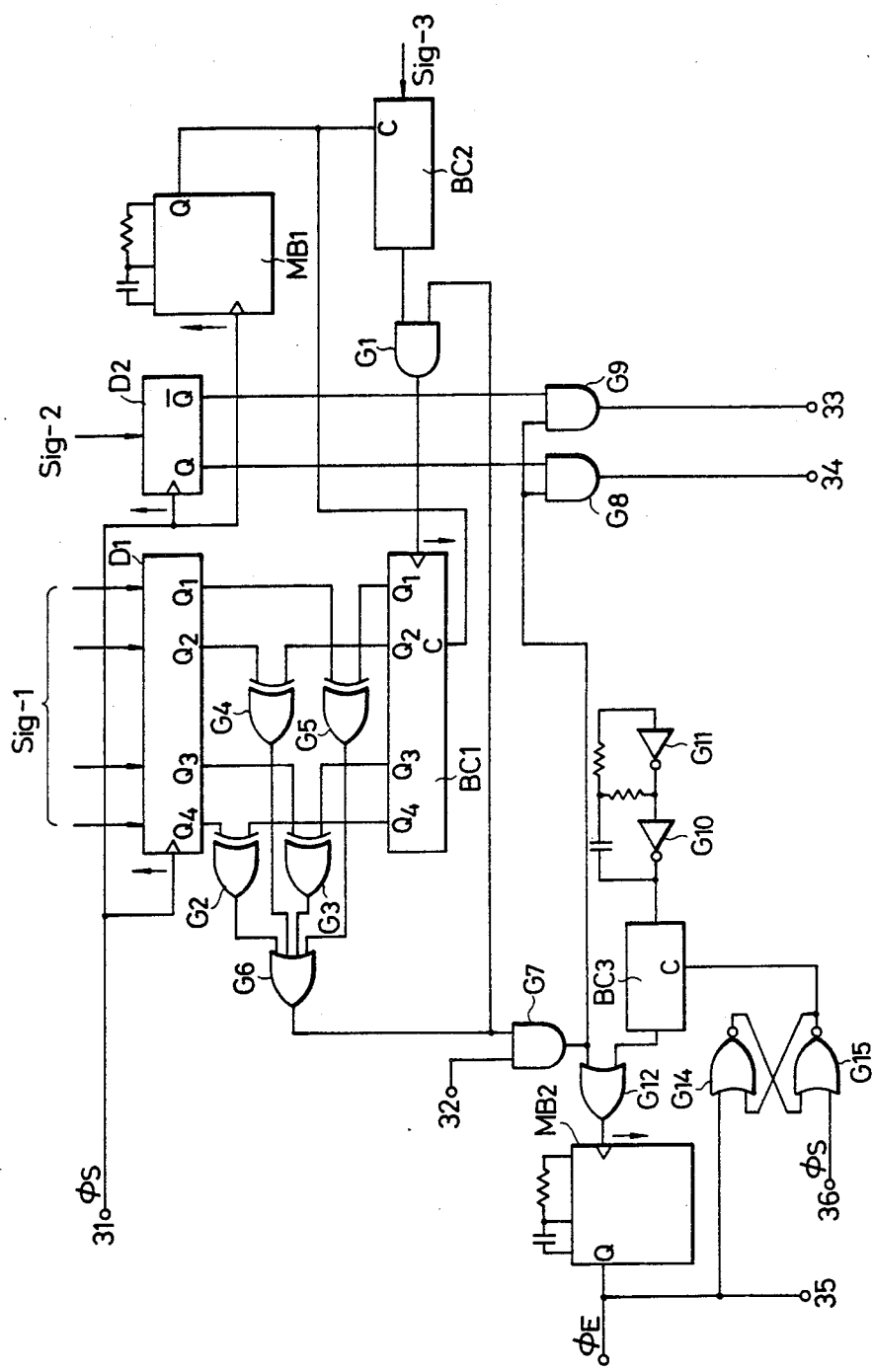
FIG. 5 is a circuit diagram specifically showing the motor drive circuit of FIG. 1.

FIG. 5 shows an embodiment of a part of the drive circuit 15 of FIG. 1. In FIG. 5, the filter output $P_1$ and the static output $P_2$ comprise a lens movement amount signal Sig-1 of 4-bit binary code representative of the movement amount data X of the lens 16 in the direction of the optical axis and a lens movement direction signal Sig-2 representative of the data ($\pm$) of the direction of movement of the lens 16. The lens control direction signal Sig-2, for example, stands a flag of H when the lens 16 is moved forward relative to the object, and stands a flag of L when the lens 16 is moved backward relative to the object.

Now, the lens movement amount signal Sig-1 is applied as the parallel input of a D latch circuit $D_1$ and the lens movement direction signal Sig-2 is applied as the parallel input of a D latch circuit $D_2$. The strobe pulse $\phi_S$ from the arithmetic circuit 9 is applied to input terminals 31 and 36, the input terminal 31 being connected to the D latch circuits $D_1$ and $D_2$ and the strobe input terminal of a monostable multivibrator (hereinafter simply referred to the multivibrator) MB1, and the input terminal 36 being connected to the input terminal of a NOR gate G15. The D latch circuits $D_1$ and $D_2$ latch the signals Sig-1 and Sig-2, respectively, upon rising of the strobe pulse $\phi_S$. The multivibrator MB1 generates a clear pulse at its Q output terminal upon rising of the strobe pulse $\phi_S$. This clear pulse is applied to the clear terminals of binary counters BC1 and BC2. The amount of movement of the lens 16 is detected by counting the pulse output Sig-3 of the phototransistor 23 of FIG. 3 by the counter BC2. The output of the counter BC2 is applied to the counter BC1 through an AND gate G1. At this time, the counter BC2 frequency-divides the pulse output Sig-3, and this is standardized so that the count value of the counter BC2 conforms to the latch output of the D latch circuit $D_1$. The frequency-division ratio is determined by the gear ratio or the like of the gear train between the lens 16 and the motor M. Exclusive OR gates $G_2$-$G_5$ and an OR gate $G_6$ together constitute a coincidence circuit and, when the parallel outputs (latch outputs) $Q_1$-$Q_4$ of the D latch circuit $D_1$ are coincident with the parallel outputs $Q_1$-$Q_4$ of the counter BC1, the OR gate $G_6$ puts out L, and when the parallel outputs $Q_1$-$Q_4$ of the D latch circuit $D_1$ are not coincident with the parallel outputs $Q_1$-$Q_4$ of the counter BC1, the OR gate $G_6$ puts out H.

The D latch circuit $D_2$ puts out Q=L and $\overline{Q}$=H when the lens 16 is moved backward, and puts out Q=H and $\overline{Q}$=L when the lens 16 is moved forward. The Q and $\overline{Q}$ outputs of the D latch circuit $D_2$ provide one input of AND gates $G_8$ and $G_9$.

Terminal 32 assumes H during the depression of the release button to the first stroke, and assumes L during the depression of the release button to the second stroke and during focus lock. An AND gate $G_7$ receives the output of the OR gate $G_6$ and the output of the terminal 32 as inputs. The output of the OR gate $G_6$ provides the input of the AND gate $G_1$. The output of the AND gate $G_7$ provides the other inputs of the AND gates $G_8$ and $G_9$. The outputs of the AND gates $G_8$ and $G_9$ are applied to terminals 33 and 34, respectively. The terminals 33 and 34 are connected to an unshown circuit for controlling the drive and the direction of rotation of the motor M. This unshown circuit can be constituted, for example, by the motor control device, etc. disclosed in U.S. Pat. No. 4,319,171.

An oscillation circuit comprising inverters $G_{10}$ and $G_{11}$, a binary counter BC3 and a flip-flop comprising NOR gates $G_{14}$ and $G_{15}$ together constitute a timer circuit. The counter BC3 generates a timer pulse when it counts up. An OR gate $G_{12}$ receives this timer pulse and the output of the AND gate $G_7$ as inputs. A multivibrator MB2 receives the output of the OR gate $G_{12}$ as trigger input, and the Q output thereof is applied as the lens drive termination pulse $\phi_E$ to the input terminal of the NOR gate $G_{14}$ of the flip-flop and to a terminal 35. The terminal 35 is connected to the previously mentioned unshown circuit for controlling the drive and the direction of rotation of the motor M. Operation will hereinafter be described briefly.

Let it be assumed that the parallel outputs of the D latch circuit $D_1$ and the counter BC1 have become coincident and the motor drive has been terminated. In this state, when the strobe pulse $\phi_S$ is applied from the arithmetic circuit 9 to the terminal 31, the D latch circuits $D_1$ and $D_2$ latch the lens movement amount signal Sig-1 and the lens movement direction signal Sig-2, respectively. At the same time, the multivibrator MB1 generates a clear pulse and therefore, the counters BC1 and BC2 are cleared. Thereupon, the output of the coincidence circuit (the output of the OR gate $G_6$) becomes H (when the movement of the lens is not necessary, the output of the coincidence circuit remains L). Thereupon, the AND gate $G_7$ puts out H to open the gates of the AND gates $G_1$, $G_8$ and $G_9$. Therefore, the Q and $\overline{Q}$ outputs of the D latch circuit $D_2$ are applied to terminals 34 and 33, respectively, through the AND gates $G_8$ and $G_9$. On the basis of the flags of the terminals 33 and 34, the motor M is supplied with power so as to move the lens 16 forward or backward. At this time, the revolutions of the motor M, namely, the amount of movement of the lens 16, is counted by the counter BC1 through the counter BC2 and AND gate $G_1$. When the count value, namely, the parallel output, of the counter BC1 becomes coincident with the parallel output of the D latch circuit $D_1$, the OR gate $G_6$ puts out L. Therefore, the output of the AND gate $G_7$ is inverted from H to L and thus, the gates of the AND gates $G_1$, $G_8$ and $G_9$ are closed and the supply of power to the motor M is stopped. At the same time, the output of the OR gate $G_{12}$ is inverted from H to L and therefore, the multivibrator MB2 generates the lens drive termination pulse $\phi_E$ at its Q output terminal for a predetermined time. The rotation of the motor M is stopped by this lens drive termination pulse $\phi_E$.

The operation of the timer circuit will now be described by reference to FIG. 4J. FIG. 4J shows the output of a flip-flop comprising NOR gates $G_{14}$ and $G_{15}$. The flip-flop comprising NOR gates $G_{14}$ and $G_{15}$ renders the output to the clear terminal of counter BC3 L in response to the rising of the strobe pulse $\phi_S$ input from the terminal 6. By this, the counter BC3 starts to count the pulses from the oscillation circuit. When a predetermined time exceeding the time required for the movement of the lens 16 from the very short distance position to the infinity position is counted, the counter BC3 applies a timer pulse to the OR gate $G_{12}$. The multivibrator MB2 is triggered by the falling of this timer pulse and puts out the lens drive termination pulse $\phi_E$. The flip-flop renders the output to the clear terminal of the counter BC3 H upon rising of the lens drive termination pulse $\phi_E$. The counter BC3 is reset thereby and stops counting the pulses from the oscillation circuit. That is, the multivibrator MB2 is designed to be triggered by the inversion of the AND gate $G_7$ from H to L and the falling of the timer pulse. The operation of this timer circuit will become clear if it is associated with the operation of the embodiment of FIG. 1. That is, in the embodiment of FIG. 1, the strobe pulse $\phi_S$ is used as the reset pulse $\phi_R$ when the brightness is high, and the lens drive termination pulse $\phi_E$ is used as the reset pulse $\phi_R$ when the brightness is low. That is, when the brightness is high, charge accumulation is initiated by the strobe pulse $\phi_S$, and when the brightness is low, charge accumulation is initiated by the lens drive termination pulse $\phi_E$. However, if, in the case of low brightness, the in-focus state continues during the period from after the lens drive termination pulse has been put out until the CCD distance measuring sensor 6 starts charge accumulation and puts out a signal to the A/D converter 8, the multivibrator MB2 is not triggered by the output of the AND gate $G_7$ because the output of the OR gate $G_6$ remains L. Therefore, it is necessary that the multivibrator MB2 be triggered by the timer output to thereby forcibly cause the lens drive termination pulse $\phi_E$ to be generated. If this is done, the control information $P_0$ can be calculated by the second charge accumulation and thus, the lens 16 will be controlled more accurately.

Figure 6:
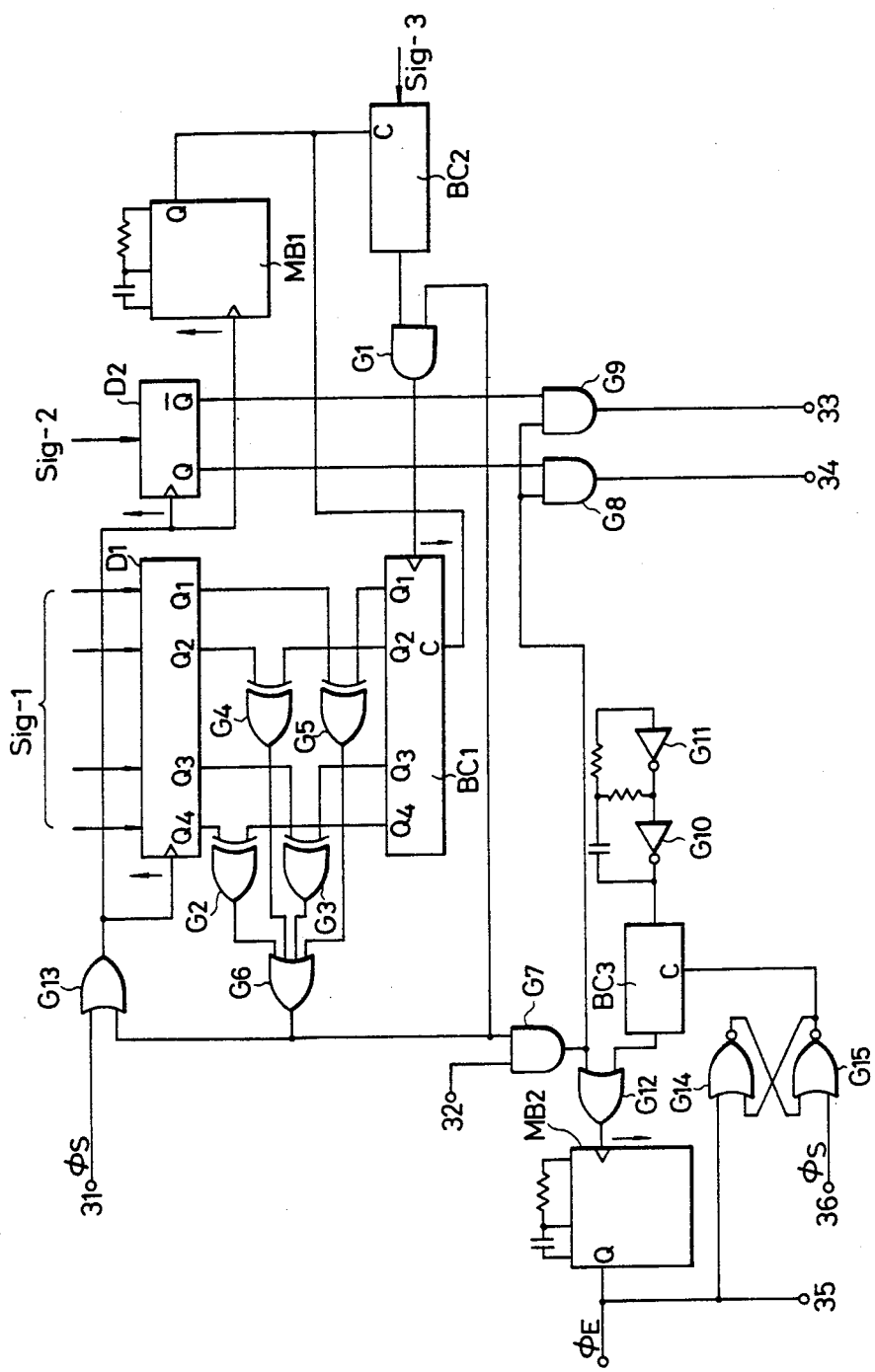
FIG. 6 is another circuit diagram specifically showing the motor drive circuit of FIG. 1.

FIG. 6 shows another embodiment of a part of the drive circuit 15. In this embodiment, the D latch circuits $D_1$ and $D_2$ and the multivibrator MB1 are strobed by the output of an OR gate $G_{13}$ which receives the output of the OR gate $G_6$ and the strobe pulse $\phi_S$ as inputs. The output of the OR gate $G_6$ puts out L when the parallel outputs of the D latch circuit $D_1$ and counter BC1 are coincident, and puts out H when said parallel outputs are not coincident, and therefore, when the output of the OR gate $G_6$ is H (that is, when the lens 16 is being servo-controlled), the D latch circuits $D_1$ and $D_2$ and multivibrator MB1 are not strobed even if the storbe pulse $\phi_S$ is applied. The D latch circuits $D_1$ and $D_2$ and multivibrator MB1 are strobed only by the strobe pulse $\phi_S$ after the servo-control of the lens 16 has been terminated, that is, after the output of the OR gate $G_6$ has been inverted to L. Accordingly, in this example of the circuit, the following characteristic is provided to the operation of the first embodiment when the brightness is high. That is, during the servo-control of the lens 16, the filter output $P_1$ from the second selection circuit 14 is not read in, but is read in after the servo-control has been terminated. On the other hand, the CCD distance measuring sensor 6, the arithmetic circuit 9 and the filter circuit 11 successively operate in association with the strobe pulse $\phi_S$.

Even in such an operation, smooth movement of the lens can be expected when the brightness of the object is high.

I claim:

1. An automatic focus adjusting device including:
   (a) an optical system for forming the image of an object to be photographed on a predetermined plane;
   (b) photoelectric converting means including a plurality of photoelectric elements for accumulating therein a charge corresponding to the quantity of light from said object, said photoelectric converting means being capable of producing with lapse of time an output indicative of the state of the image of said object on said predetermined plane;
   (c) means for controlling the charge accumulating time of said photoelectric elements in accordance with the brightness of said object;
   (d) position detecting means for detecting the positional relation between the image of said object and said predetermined plane in accordance with the output of said photoelectric converting means and producing a position signal indicative of said positional relation each time said photoelectric converting means produces an output;
   (e) filter means for receiving said position signal as input, modifying the newest position signal of said input position signal on the basis of at least one past position signal and putting out a filter signal;
   (f) brightness detecting means for detecting the brightness of said object and putting out a brightness signal when the brightness of said object is lower than a predetermined value;
   (g) selecting means for selecting and putting out one of said position signal and said filter signal in accordance with said brightness signal; and
   (h) means for driving said optical system in a direction in which the image of said object is formed on said predetermined plane, in accordance with the output of said selecting means.

2. An automatic focus adjusting device according to claim 1, wherein said selecting means selects said filter signal when the brightness of said object is higher than said predetermined value, and selects said position signal when the brightness of said object is lower than said predetermined value.

3. An automatic focus adjusting device according to claim 2, wherein said filter means includes means capable of storing therein a predetermined number of said position signals successively, and modifying means for multiplying each of said stored position signals by any weight and taking the sum thereof and outputting it as said filter signals.

4. An automatic focus adjusting device according to claim 3, further including means for setting the value of each of said weights in accordance with the focal length of said optical system.

5. An automatic focus adjusting device according to claim 3, further including means for setting the value of each of said weights in accordance with the brightness of said object.

6. An automatic focus adjusting device according to claim 3, wherein said selecting means receives as input one of the position signals stored in said storing means.

7. An automatic focus adjusting device according to claim 1, wherein said driving means includes timer means for initiating the charge accumulation of said photoelectric elements in a predetermined period after the driving of said optical system has been terminated.

8. An automatic focus adjusting device including:
   (a) an optical system for forming the image of an object to be photographed on a predetermined plane;
   (b) photoelectric converting means including a plurality of photoelectric elements for accumulating therein a charge corresponding to the quantity of light from said object, said photoelectric converting means being capable of producing with lapse of time an output indicative of the state of the image of said object on said predetermined plane;
   (c) means for controlling the charge accumulating time of said photoelectric elements in accordance with the brightness of said object;
   (d) position detecting means for detecting the positional relation between the image of said object and said predetermined plane in accordance with the output of said photoelectric converting means and producing a position signal indicative of said positional relation each time said photoelectric converting means produces an output;
   (e) filter means for receiving said position signal as input, modifying the newest position signal of said input position signal on the basis of at least one past position signal and putting out a filter signal;
   (f) brightness detecting means for detecting the brightness of said object and putting out a brightness signal when the brightness of said object is lower than a predetermined value;
   (g) first selecting means for selecting and putting out one of said position signal and said filter signal in accordance with said brightness signal;
   (h) means for driving said optical system in a direction in which the image of said object is formed on said predetermined plane, in accordance with the output of said selecting means;
   (i) means for putting out a first initiation signal for initiating the charge accumulation of said photoelectric elements in response to the outputting of said position detection signal of said position detecting means;
   (j) means for putting out a second initiation signal for initiating the charge accumulation of said photoelectric elements in response to the formation of the image of said object on said predetermined plane; and
   (k) second selecting means for receiving said first and second initiation signals as inputs and selecting and putting out one of said first and second initiation signals in accordance with said brightness signal.

9. An automatic focus adjusting device according to claim 8, wherein said means for putting out the second initiation signal includes timer means capable of putting out said second initiation signal in a predetermined period after said first initiation signal has been put out.

10. An automatic focus adjusting device according to claim 9, wherein said predetermined period is longer than the time required for said driving means to terminate the driving of said optical system.

* * * * *